United States Patent [19]

Sivertson, Jr.

[11] Patent Number: 4,460,296

[45] Date of Patent: Jul. 17, 1984

[54] KEYLESS CHUCK GRIPPING DEVICE

[76] Inventor: Wilford E. Sivertson, Jr., 205 Dogwood Ct., Yorktown, Va. 23692

[21] Appl. No.: 270,246

[22] Filed: Jun. 4, 1981

[51] Int. Cl.$^3$ ............................................. F04D 25/02
[52] U.S. Cl. .................... 408/124; 81/90 A; 279/1 K; 279/62; 408/239 R; 408/241 R
[58] Field of Search ............... 408/241 R, 239 R, 124, 408/210; 81/90 A, 3.4; 279/1 K, 1 Q, 56, 60, 61, 62, 63, 64, 65; 29/450, 235

[56] References Cited

U.S. PATENT DOCUMENTS

| | | | |
|---|---|---|---|
| 193,899 | 10/1863 | Harrison | 81/3.4 |
| 2,003,983 | 6/1935 | Thener | 81/3.4 |
| 2,023,975 | 12/1935 | Qualey | 81/3.4 |
| 4,095,811 | 6/1978 | Cohen | 81/3.4 |
| 4,277,074 | 7/1981 | Kilberis | 279/62 |
| 4,317,578 | 3/1982 | Welch | 279/60 |

Primary Examiner—Frank T. Yost
Assistant Examiner—Hien H. Phan
Attorney, Agent, or Firm—Lowe, King, Price & Becker

[57] ABSTRACT

A keyless chuck gripping device for opening or closing jaws of a chuck of a rotary tool without using a chuck key includes a first portion having a surface extending at least partially around an outer surface of a chuck locking drum. The first portion is attached to a forward housing portion of the rotary tool or the outer surface of the chuck locking drum. A second portion connected to the first portion is urged into frictional or lock engagement with the unattached portion of the rotary tool where manual actuation alters rotational speed of the chuck locking drum relative to the speed of the rotary tool shaft. The second portion maintains the chuck locking drum in a stationary position while the shaft is driven by the motor, enabling the chuck locking drum to turn the chuck jaws in forward or reverse direction.

13 Claims, 14 Drawing Figures

KEYLESS CHUCK GRIPPING DEVICE

BACKGROUND ART

The present invention relates generally to keyless chucks for rotary power tools and, more particularly, to a keyless chuck gripping device securely fastened to a portion of a rotary tool and selectively engaged with a chuck locking drum or rotary tool housing for manually restraining locking drum rotary movement to open or close jaws of the chuck using the rotary tool's energy.

Rotary tools are commonly used by professional and amateur craftsmen to perform various operations, such as drilling, screwing, sanding and the like. Currently, such tools typically include an electric or fluid motor unit mounted within a protective housing having a handle with a built in trigger switch for actuating the motor when rotary tool operation is desired. A drive shaft projecting forwardly from the motor and housing carries a chuck assembly. The chuck assembly includes a chuck locking drum cylinder and a chuck inner cylinder; the inner cylinder is threadedly received on the drive shaft and the locking drum cylinder is mounted concentric to the inner cylinder. Plural chuck jaws threadedly engaging the locking drum are opened or closed in response to the locking drum being driven in clockwise or counterclockwise directions. Shafts of rotary tool implements, such as drills, screw drivers, wrench drivers and the like, include shank portions that are carried by the chuck jaws.

Current art chuck jaws are adjusted to receive differently sized tool shafts by turning the locking drum via a bevel gear provided on a forward edge of the locking drum. The chuck jaws are manually opened or closed while the drive shaft remains stationary by inserting toothed portions and a pivot pin of a separate pivot key element into the bevel gear and one of plural equispaced pivot holes on the chuck inner cylinder, respectively.

Prior art pivot keys have several disadvantages. For example, the key is often misplaced or lost, especially when used with a portable tool such as an electric or fluid powered drill, and may be dropped into inaccessible or dangerous areas of a tool shop or work area. In addition, the small size of the pivot key often renders hand manipulation difficult and may result in considerable time loss for inserting or removing the implements. Such tedious manipulation is particularly annoying and can be costly on jobs that require frequent chuck operations. Further, several turns of the pivot key are required to open, close, secure and release a given chuck attachment, with each turn necessitating manual repositioning while simultaneously rotating the bevel gear. During repeated use, both the key and corresponding mating surfaces on the chuck gradually wear down, eventually requiring replacement of the chuck and/or key.

While keyless chuck gripping devices obviating the need for a pivot key are known, they have several disadvantages and are not known to have been accepted commercially. In U.S. Pat. No. 4,095,811 to Cohen, for example, there is disclosed a chuck jaw operating device including a drive sleeve and studded anchor ring formed of resilient material such as rubber. The drive sleeve and studded anchor ring are respectively mounted to the chuck locking drum and inner chuck cylinder. The sleeve and ring are manually and simultaneously grasped and counterrotated to operate the chuck jaws while the drive shaft is stationary. Such a device permits manual chuck jaw operation without the use of a key; however, both hands are required to engage the chuck portion of the rotary tool, making it necessary to balance the bulky, heavier motor portion during chuck manipulation. Further, manually derived torques for tightening a tool shaft within the chuck jaws may be insufficient to resist torque forces generated during tool use; this may result in tool shaft slippage within the jaws and possible tool damage. In addition, the drive sleeve and studded anchor ring are manually installed and removed from the chuck each time a chuck tool is positioned within or removed from the chuck. The operation also can be time consuming and would require two separate devices (drive sleeve and studded anchor ring) in substitution for the prior art pivot key element.

It is accordingly an object of the present invention to provide a new and improved keyless chuck gripping device that uses power tool energy for operation and is permanently affixed to a portion of the rotary tool and capable of convenient and reliable hand manipulation for controlling opening or closing of the chuck jaws.

Another object of the invention is to provide a keyless chuck gripping device capable of using rotary tool power for generating sufficient torques for secure tightening of a tool shaft in the chuck jaws without slippage during drill use.

Still another object is to provide a keyless chuck gripping device capable of being manually operated with one hand to enable secure support of the rotary tool at all times.

Another object of the present invention is to provide a keyless chuck gripping device which may be purchased apart from a rotary tool and easily installed.

Yet another object is to provide a keyless chuck gripping device which can be an integral part of a rotary tool.

Still a further object is to provide a keyless chuck gripping device wherein relatively large hand generated torques are achieved in a safe manner through motor unit actuation when opening or closing the chuck jaws.

DISCLOSURE OF INVENTION

A keyless chuck gripping device, in accordance with the present invention, comprises a first portion having a surface extending at least partially around an outer surface of a chuck locking drum; the first portion is fixedly attached to a portion of the rotary tool. A second portion of the keyless chuck gripping device, connected to the first portion, is capable of being urged into contact with another portion of the rotary tool when actuated by hand pressure to control the rotational torque of the chuck locking drum relative to the controlled rotation of the rotary tool drive shaft. The second portion maintains the chuck locking drum in a substantially stable position while the shaft of the rotary tool is driven by the motor to open and close the chuck jaws. Such jaw actuating movement in forward or reverse rotary tool rotational directions is achieved by operating the first and second portions together to engage both the housing and chuck locking drum and thereby maintain the locking drum in a stationary position during motor drive shaft actuation.

Accordng to one embodiment of the present invention, a keyless chuck gripping device comprises a resilient annular sleeve that elastically and frictionally fits a chuck locking drum. Axially aligned gripping fins are provided at spaced circumferential intervals along an outer gripping surface of the annular sleeve for allowing safe, hand controlled modulation of chuck opening and closing torques. Each fin extends longitudinally along the gripping surface and includes an outer fin portion formed along the rear portion of the gripping surface; the remaining fin portion is inwardly tapered to provide a contour with surface area characteristics similar to those of a cupped, recessed palm portion of an operator's hand to facilitate manual engagement of the fins. In one embodiment, a rear flange portion of uniform cross section projects outwardly from the annular ring so that it is rearwardly adjacent the outer fin portion to enable hand controlled flange contact with the drill motor case for torque modulation.

In another embodiment a shaped annular flange located rearwardly adjacent the outer fin portion replaces the rear flange portion. The shaped flange includes an outer hand contact surface facing the gripping fins and a housing contact surface facing the housing. Application of slight hand pressure on the hand contact surface urges the housing contact surface into frictional engagement with the housing, resulting in high hand-controlled torque when the motor unit is actuated.

In a further embodiment, a concentric cylinder is slidably attached to the outer surface of the chuck locking drum by equispaced slots or rails formed in an inner surface of the cylinder; the slots or rails engage corresponding fixed guide rails or slots machined in or attached to the rear portion of the locking drum. Forward and rear lip projections extend from the concentric cylinder edges to the locking drum outer surface. A spring between the inner surface of the cylinder and the outer surface of the locking drum is retained between the forward lip projection and a forward projection edge of the guide rails for biasing the cylinder away from the housing during normal rotary tool operation.

Frictional braking means is provided between the concentric cylinder and the housing. Such braking means preferably includes a resilient circular ring fixedly attached to rear portions of the cylinder by adhesive or other suitable means. With this design, the ring frictionally engages the housing to maintain the locking drum in fixed position during motor unit actuation. The ring returns to a normal inoperative position when rearward thrusting hand pressure is released from the cylinder.

In yet a further embodiment, a cylinder portion has an end wall for fixedly mounting the cylinder to the rotary tool housing to enable the cylinder walls to extend around the locking drum in parallel, spaced relation. A pair of diametrically opposed openings in the cylinder walls receive a pair of locking pins having pin shafts dimensionsed for locking engagement with chuck detent holes formed in corresponding positions in the locking drum. Each locking pin is spring loaded away from the locking drum by a spring positioned around the pin shaft. The spring is positioned between an outer surface of the cylinder wall and a pin head; complete withdrawal of the pin from the cylinder is prevented by a retaining ring snap fitted to the pin shaft between the inner surface of the cylinder wall and the locking drum. To open or close the chuck jaws, one or more of the locking pins are radially displaced into locking engagement with a corresponding chuck detent hole for locking up the drum while the motor is actuated.

In still another embodiment a solid cylindrical portion attached to the housing includes a mounting surface extending transversely in relation to the outer surface of the locking drum. Three equispaced cam pins project outwardly from the mounting surface in parallel relation to the locking drum outer surface. A cylindrical disc portion carried by the cam pins includes a circular outer surface and an inner surface defining a solid body portion concentrically mounted around the locking drum in spaced relation therewith. Three elongated resilient brake arms are formed integrally with the inner surface in spaced tangential relation along a portion of the outer locking drum surface. Each brake arm includes a frictional gripping surface facing the locking drum outer surface and an interior cam surface in abutment with the cam pins. Manual rotation of the cylindrical disc urges each cam pin against an outwardly curved and/or tapered surface of the cam surface to displace the brake arm radially into frictional engagement with the locking drum outer surface.

The above and still further objects, features, and advantages of the present invention will become apparent upon consideration of the following detailed description of several preferred embodiments thereof, especially when taken in conjunction with the accompanying drawing.

BEST MODE FOR CARRYING OUT THE INVENTION

Figures 1, 2, 3:
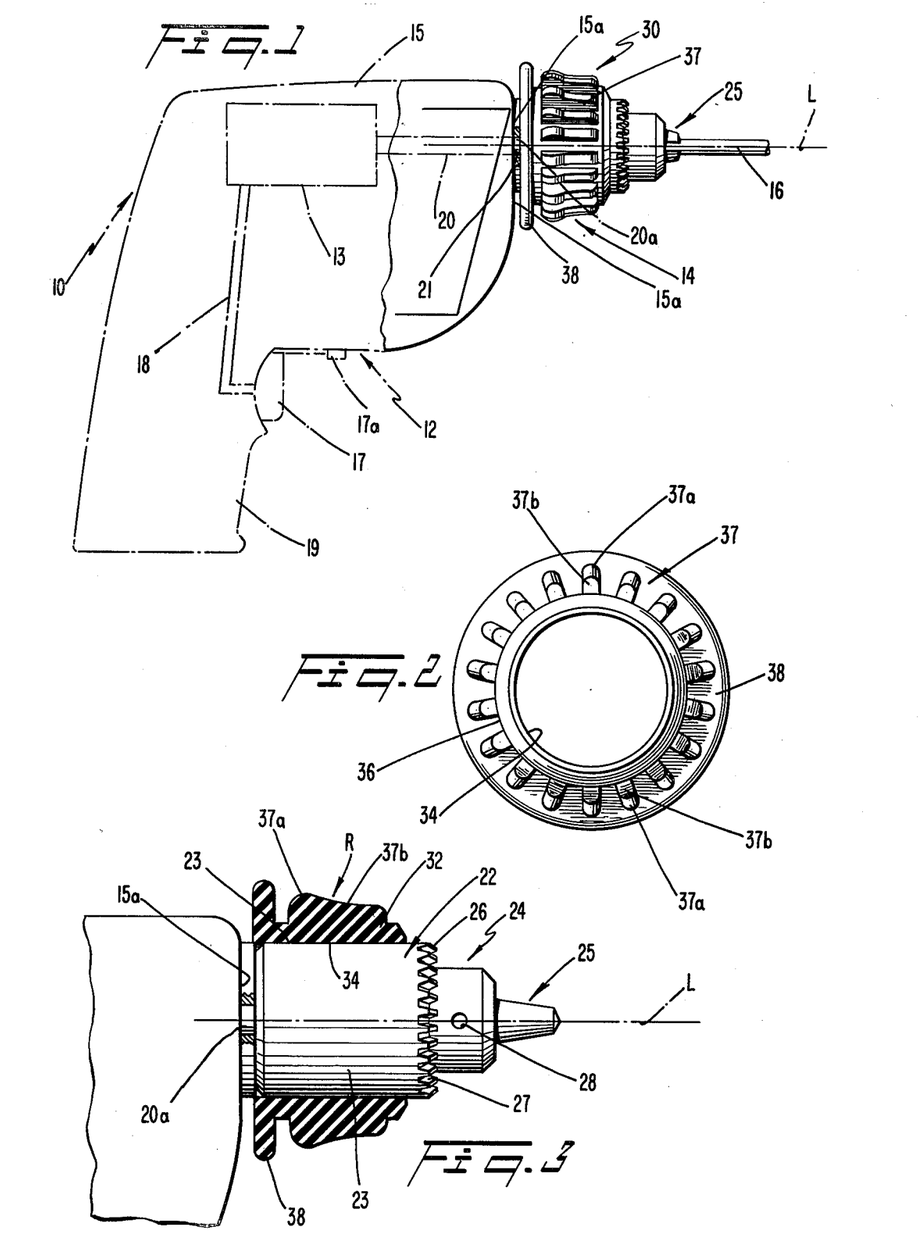
FIG. 1 is a side view of a motor driven rotary tool employing one embodiment of a keyless chuck gripping device of the present invention.
FIG. 2 is an enlarged front plan view of the keyless chuck gripping device shown in FIG. 1.
FIG. 3 is a cross sectional side view of the keyless chuck gripping device shown in FIGS. 1 and 2.

Reference is now made to FIG. 1, wherein there is illustrated a typical rotary tool 10, having rearwardly located motor portion 12 and forward chuck portion 14 designed for rigidly securing rotary tool implement 16. Implement 16 may be a drill, sander, screw driver or other suitable device. Motor portion 12 includes motor unit 13 (shown in phantom), which may be electrically, pneumatically, or hydraulically driven, mounted within protective outer housing 15. Handle 19, at a lower rear end portion of housing 15, includes variable speed trigger switch 17, having rotational direction control 17a, connected to motor 13 by electric or fluid control lines 18 for actuating the motor while the switch is depressed by an operator's hand. Motor 13 includes shaft 20 that projects from housing 15 along longitudinal axis L through a circular opening 21 in forward housing portion 15a. Portion 15a includes an annular shape shoulder portion surrounding opening 21 defining an abutment surface facing chuck portion 14. Chuck portion 14 is carried on drive shaft 20 for driven rotational movement.

Chuck portion 14 includes chuck loading drum cylinder 22 (FIG. 3) that can be threadedly received on inner cylinder 24 in closest proximity to housing portion 15a. Chuck locking drum 22 includes outer drum surface 23. Chuck inner cylinder 24 is concentric to and mounted forwardly of and adjacent chuck locking drum 22 on drive shaft 20. Chuck jaws 25 are mounted forwardly of inner cylinder 24 and include interior threaded portions threadedly engaging an interior surface of chuck locking drum 22, so turning the locking drum causes the chuck jaws to open or close so implements 16 can be inserted and removed. In the open and closed positions jaws 25 are respectively retracted into and project forwardly of cylinder 24. In the prior art, chuck locking drum 22 is turned by driving the bevel gear 26 on forward circumferential edge 27 with a key pivot element (not shown); toothed portions and a pin of the key pivot respectively engage the bevel gear 26 and pivot hole 28 to open and close chuck jaws 25 when drive shaft 20 is stationary.

According to the embodiment shown in FIGS. 1-3, keyless chuck device 30 comprises an annular sleeve 32 having inner surface 34 and outer gripping surface 36. Annular sleeve 32 is dimensioned to have an inner diameter slightly less than the outer diameter of chuck locking drum 22, and an axial dimension substantially equal to the length of the locking drum. Annular sleeve 32 is formed of a resilient material having a high coefficient of friction, such as rubber. Interior surface 34 of sleeve 32 is frictionally urged against outer drum surface 23 by compressional forces of the sleeve against the drum resulting from the sleeve having an unexpanded inner diameter slightly less than the exterior diameter of the drum surface.

Axially aligned gripping fins 37 are provided at equi-spaced circumferential intervals along outer gripping surface 36 for allowing safe and comfortable hand controlled modulation of chuck opening and closing torques. As best shown in FIG. 2, eighteen fins 37 are formed at 20° intervals along outer gripping surface 36. To provide a hand gripping surface of sufficient area, each of fins 37 has a longitudinal dimension of approximately ⅝ inches, and a rearwardly located outer fin portion 37a extending radially approximately 3/16 inches from outer gripping surface 36. An arc having a radius R (of approximately 1 inch) defines the forwardly tapered contour of forward fin portion 37b. The described gripping fins 37 provide good contour and surface area characteristics for safe manual engagement to develop and maintain proper hand torques for rotating locking drum 22. However, the above dimensional characteristics are not intended to be the sole means for providing appropriate gripping fin means; it will be understood that other gripping fins, ridges or suitable surface features are capable of providing the desired hand grasping characteristics.

In operation, chuck locking drum 22 is restrained by manually grasping annular sleeve 32 about gripping fins 37 while simultaneously engaging motor 13 that drives shaft 20 at a controlled, slow speed and high torque. By virtue of the highly frictional and elastic characteristics of inner surface 34 acting on outer surface 23 to restrain movement of locking drum 22, shaft 20 rotates chuck jaws 25 relative to the locking drum, to open the jaws during reverse drill rotation and close the jaws during forward drill rotation. In this manner, keyless chuck device 30 facilitates manipulation of chuck 14, enabling fast and reliable changing of tool implements 16 for different rotary tool operations without requiring the use of a separate key device.

Annular sleeve 32 and gripping fins 37 can be fabricated as a unitary structure through injection molding and/or curing of rubber or polymer materials, such as Latex Base, RTV-630, or other similar materials such as Devco Flexane. Keyless chuck device 30 can be retrofitted on previously purchased rotary tools 10 or furnished with or manufactured as an integral part of a new, originally furnished rotary tool. In the latter case, the manufacturing process of rotary tool 10 does not necessarily require machining of bevel gear 26 or pivot holes 28, as described supra.

Rear uniform cross section flange portion 38 is preferably provided on outer gripping surface 36, rearwardly adjacent outer fin portion 37a. As shown in FIG. 1, flange portion 38 is formed as a thin, circular shaped flange projecting outwardly from gripping surface 36. Flange portion 38 is designed to allow hand controlled flange contact when manually urged into contact with forward housing portion 15a for torque modulation, and is particularly useful on drills having low power motors. In addition, flange portion 38 prevents intrusion of foreign objects in the area of exposed drive shaft portion 20a.

Figures 4, 5:
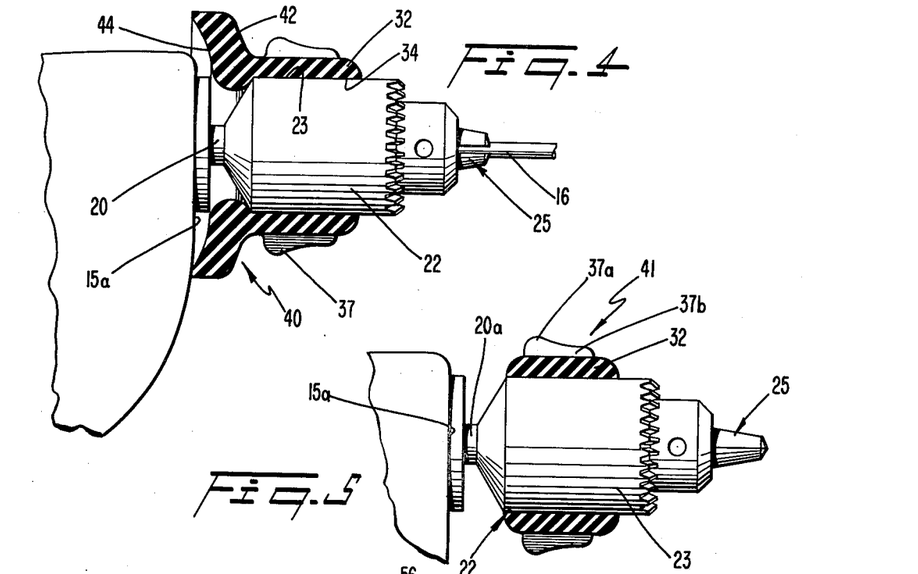
FIG. 4 is a cross sectional side view of another embodiment of the present invention showing a shaped flange for frictionally engaging forward housing portions of a rotary tool.
FIG. 5 is a side view of another embodiment of the present invention without a flange portion.

In another preferred embodiment of keyless chuck device 30, as shown in FIG. 4, shaped annular flange 40 that replaces uniform cross section flange portion 38 includes forward hand contact surface 42 proximate gripping fins 37 and housing contact surface 44 proximate housing portion 15a. Housing contact surface 44 is shaped to approximate the contour of forward housing portion 15a and is capable of high frictional engagement with the housing portion when indexed toward the housing by hand pressure.

In operation, the palm area of an operator's hand wraps around gripping fins 37 before motor unit 13 is actuated by a digit on the other hand. Pressure is applied to outer contact surface 42 and a slight forcing action displaces housing contact surface 44 in abutment with forward housing portion 15a. While maintaining pressure on gripping fins 37 and flange 40, motor unit 13 is actuated in a controlled slow speed high torque mode in a similar manner to keyless chuck device 30. Relatively high frictional engagement between surfaces 15a, 44 resists rotational forces transmitted from outer surface 23 of locking drum 22 to inner surface 34 of annular sleeve 32, thereby maintaining the locking drum stationary while chuck jaws 25 open or close depending upon the rotational direction of drive shaft 20. With this design, manual chuck operation is achieved at high motor torques for rigidly securing tool implement 16 within chuck jaws 25. In addition, frictional engagement between surfaces 15a, 44 may be enhanced by increasing the coefficient of friction of these surfaces by using appropriate surface materials and/or surface roughness treatment.

Keyless chuck device 30 having flange portion 38 generally requires less material to manufacture than the chuck device including shaped flange 40. Flange 40 is shaped to have greater surface area housing contact and mechanical advantage compared to flange 38, and is particularly useful for higher torque (power) rotary tools; whereas, uniform cross section flange 38 is best suited for use on tools having lower power motors. However, each embodiment is fabricated of materials having a high coefficient of friction with the housing.

Keyless chuck device 41, shown in FIG. 5, does not include flange portion 38 or flange 40, and is operable by manually grasping gripping fins 37 to restrain locking drum 22 from movement in relation to drive shaft 20 controlled by the operator.

Figures 6, 7:
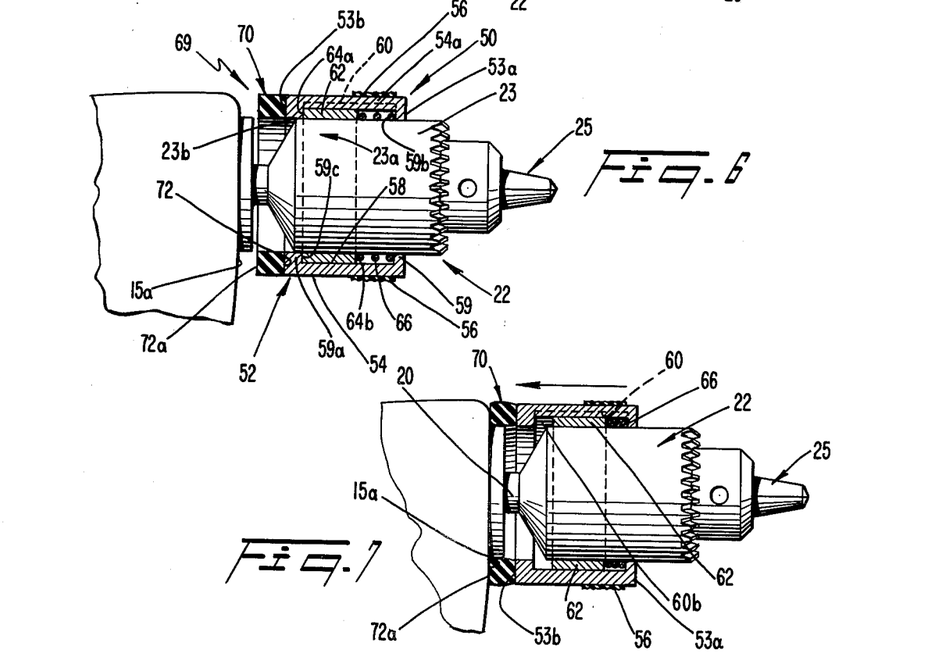
FIG. 6 is a cross sectional side view of another embodiment of the present invention wherein a concentric cylinder is slidably mounted on the chuck locking drum and carrying friction brake means for selectively engaging the forward drill housing portion.
FIG. 7 is a cross sectional side view of the embodiment shown in FIG. 6, showing the frictional brake means in engagement with the forward housing portion.

Reference is now made to FIGS. 6 and 7 of the drawing wherein there is illustrated another embodiment of keyless chuck device 50 in accordance with the invention. Keyless chuck device 50 comprises cylinder 52, concentric with locking drum 22 and having an axial length so it substantially covers outer drum surface 23. Cylinder 52 has an outer circular cross section surface 54, including finger gripping surface 56 peripherally disposed around forward portion 54a of the cylinder. Gripping surface 56 is preferably knurled to facilitate grasping of cylinder 52 so the cylinder can be rearwardly indexed (FIG. 7) into frictional engagement with forward housing portion 15a, as discussed, infra. Cylinder 52 includes inner cylindrical surface 58 having a diameter slightly greater than the outer diameter of locking drum 22. Forward and rear lip portions 59, 59a of cylinder 52 are formed integrally with circumferential forward and rear edges 53a, 53b to project inwardly into near abutment with surface 23. A set of three longitudinally aligned (120° spacing), eqispaced elongated slots 60 extend along the length of inner cylinder surface 58 between lip portions 59, 59a.

Three longitudinally aligned, fixed guide rails 62 are machined or attached to outer locking drum surface 23 during manufacture of chuck assembly 14 in corresponding locations for sliding engagement with slots 60. Rails 62 project outwardly from surface 23 a distance sufficient to permit them to be retained within slots 60 for maintaining frictional brake means 69 in proper alignment with forward housing portion 15a, as described infra. Guide rails 62 extend over only the rear half portion 23a of outer locking drum surface 23 and include a rear edge projection 64a spaced forwardly from rear locking drum surface 23b for a distance equal to the thickness of rear lip portion 59a. Rails 62 terminate at a forward point defining retaining edge projection 64b. Coil compression spring 66 between inner surface 58 of cylinder 52 and outer locking drum surface 23 extends around the locking drum cylinder so it is captured between inner edge 59b of forward lip 59 and retaining edge 64b. Spring 66 biases cylinder 52 away from forward housing portion 15a during normal operation of the rotary tool, at which time unwarranted forward travel of cylinder 52 is prevented by rear edge projection 64a abutting against rear lip inner surface 59c.

Frictional braking means 69 between cylinder 52 and forward housing portion 15a opens and closes chuck jaws 25 by being indexed rearwardly into controlled, low to high frictional engagement with the housing. Braking means 69 includes circular ring 70 having forward attachment surface 72 and rearward surface 72a selectively urged into abutment with housing portion 15a. Surfaces 72, 72a are annular having inner and outer diameters approximately equal to corresponding diameters of cylinder 52. Ring 70, a relatively thin member in relation to the length of cylinder 52, has an axial length less than the distance between forward housing portion 15a and rear surface 53b of the cylinder. Ring 70, fabricated from material having a high coefficient of friction, such as rubber, is fixedly mounted on rear surface 53b by adhesive or other suitable means. Thusly secured, ring 70 provides the necessary frictional engagement with forward housing portion 15a to maintain locking drum 22 in fixed position to open or close jaws 25 when necessary.

In operation, the operator applies slight pressure to gripping surfaces 56 and indexes cylinder 52 with a slight forcing action in the direction of forward housing portion 15a (FIG. 7). Spring 66 yields under slight hand pressure so cylinder 52 slides longitudinally rearward by virtue of the smooth sliding engagement between guide rails 62 and slots 60 until rear abutment surface 72a contacts forward housing portion 15a in controlled frictional engagement, providing the necessary locking force. With the hand pressure maintained, motor unit 13 is actuated to a slow speed high torque mode, tending to rotate the chuck jaws relative to locking drum 22. The torque of motor 13 is transmitted to cylinder 52 from guide rail 62 to side walls 60b of slots 60, thereby restraining rotational movement of locking drum 22 to open or close chuck jaws 25, depending upon the rotational direction of drive shaft 20. After tool implement 16 has been rigidly secured within chuck jaws 25, hand pressure applied to gripping surface 56 is released and spring 66 biases cylinder 52 to a normal inoperative position on outer surface 23, causing disengagement of ring 70 from housing portion 15a (FIG. 6). As described supra, the bias of cylinder 52 by spring 66 continues until lip portions 59, 59a are both seated on outer locking drum surface 23; excessive forward travel is prevented by rear edge projection 64a abutting against rear lip inner surface 59c.

Cylinder 52 is constructed from a hard material, such as steel, plastic, or composite materials, capable of transmitting rotational forces to ring 70 while the cylinder frictionally engages forward housing portion 15a and maintains locking drum 22 in stationary position through the interaction of slots 60 with guide rails 62. While the preferred embodiment of keyless chuck device 50 has been described with the use of three equispaced slots 60 engaging corresponding guide rails 62 on locking drum 22, it is to be understood that this embodiment may also be manufactured with a plurality of equispaced slots and guide rails capable of uniformly distributing lower torque to each slot. Alternatively, slots 60 may be replaced by pairs of equispaced slotted tracks (not shown) that engage guide rails 62. With this latter design, the longitudinal extent of the slotted tracks is slightly longer than the aforesaid length of guide rails 62 to prevent disengagement therewith.

In a different embodiment (not shown), ring 70 can be integral to cylinder 52. In this case, the cylinder is fabricated of material capable of having a high coefficient of friction with the drill housing portion; alternatively, the rear end surface (corresponding to rear surface 72a) of the cylinder includes material or is finished to provide necessary frictional engagement.

Figure 8:
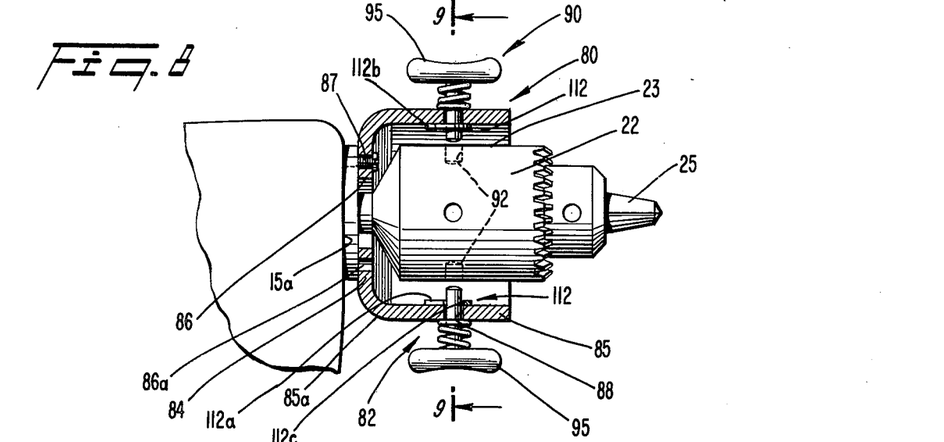
FIG. 8 is a cross sectional side view of another embodiment of the present invention showing the use of locking pins mounted on a concentric cylinder for locking engagement with chuck holes formed in the locking drum.
Figures 9, 10:
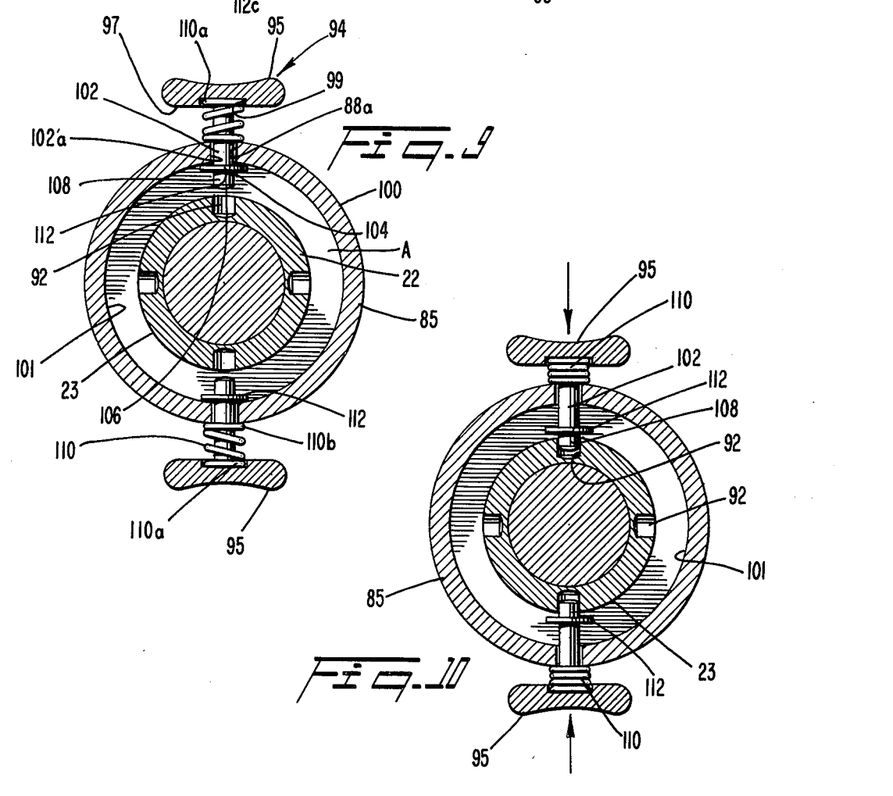
FIG. 9 is an enlarged, sectional view, taken along the line 9—9 of FIG. 8.
FIG. 10 is a view similar to FIG. 9 showing locking engagement of the locking pins in the chuck locking drum detent holes.

Reference is now made to FIGS. 8–10 of the drawing wherein there is illustrated still another embodiment of keyless chuck device 80 in accordance with the invention. Keyless chuck device 80 comprises cylinder portion 82 having radially extending end wall 84 integral with cylinder wall 85 concentric with locking drum 22; cylinder 82 has an inner diameter greater than the diameter of the locking drum 22. End wall 84, located at rear end 85a of wall 85, includes central opening 86 and a plurality of mounting holes 86a. Cylinder portion 82 is fixedly mounted against forward housing portion 15a by inserting screws 87 or the like in mounting holes 86a and corresponding threaded bores 86b in the housing portion. Cylinder wall 85 has a longitudinal length from end wall 84 to substantially cover outer locking drum surface 23.

Each of two diametrically opposed openings 88 in walls 85 respectively receives a separate locking pin 90 having a radially extending shaft 102 with a length that lockingly engages chuck detent holes 92 formed in corresponding positions on outer locking drum surface 23. Each locking pin 90 includes a disc shaped pin head 94 having a concave surface 95 to provide a better gripping surface when manual pressure is applied to the pins. Inner surface 97 of pin head 94 is trepanned to define a circular recess 99 facing outer surface 100 of cylinder wall 85. Pin shaft 102 projects inwardly toward locking drum 22 from a central portion of recess 99 and includes a circumferential groove 104 formed at free end 106 of the pin shaft. Groove 104 is spaced from free end 106 by a distance substantially equal to the depth of chuck detent holes 92, thereby defining a locking drum engagement portion 108 formed between the circumferential groove and free end.

Compression coil springs 110 on pin shafts 102 bias locking pins 90 away from locking drum 22 during normal operation of rotary tool 10. As shown in FIG. 9, opposite ends 110a and 110b of each spring 110 are respectively retained in circular recess 99 and in a trepan in outer surface 100 of cylinder walls 85 while shaft 102 is received through opening 88. Retaining ring 112 includes parallel prongs 112a defining passage 112b that communicates with central opening 112c of the retaining ring. Locking pins 90 are slidably mounted to cylinder walls 85 by passing pin shaft 102 through openings 88 until groove 104 appears in clearance area A between the cylinder walls and outer locking drum surface 23. Retaining ring 112 engages groove 104 in snap fitting relation to prevent complete withdrawal of locking pin 90 from cylinder wall 85.

In operation, cylinder portion 82 is fixedly attached to forward housing portion 15a, as previously described. Locking pins 90 are biased outwardly by spring 110 so complete withdrawal of pin shaft 102 from cylinder walls 85 is prevented by retaining rings 112 pressing against inner surface 101 of the cylinder walls. With pins 90 so positioned, locking drum 22 is capable of synchronous rotation with drive shaft 20 during normal operation of rotary tool 10. When chuck jaws 25 are to be opened or closed, motor unit 13 operation is discontinued to bring chuck portion 14 to a stationary position. Locking pins 90 are then manually depressed toward locking drum 22, as shown in FIG. 10, and motor 13 is then operated in slow speed mode enabling engagement portion 108 to engage chuck detent holes 92 and lock the drum in a fixed position. With continued slight hand pressure, motor unit 13 is then actuated in a low speed high torque mode to open or close chuck jaws 25 during lock up of locking drum 22 by locking pins 90. In this mode, torque is transmitted from locking drum 22 to shaft portions 102a abutting the inner surface 88a of openings 88, and to cylinder portion 82 and housing portion 15a. Once tool implement 16 is rigidly secured within or removed from chuck jaws 25, hand pressure is released enabling spring 110 to withdraw pin engagement portion 108 from detent holes 92 for normal rotary tool operation. With this design, pin shafts 102 have a length so they pass entirely through cylinder wall 85 and clearance area A so they have sufficient contact area with detent holes 92 to lock drum 22. In addition, the inner diameter of cylinder wall 85 must be dimensioned to provide a sufficient clearance area A that is larger than the portion of pin shaft 102 that projects inwardly from retaining ring 112 to avoid pin interference with locking drum 22 during normal rotary tool operation.

While this embodiment of the invention has been described with the use of a concentrically mounted cylinder having diametrically opposed locking pins, the device is capable of reliable operation with only one locking pin if sufficiently rigid materials are used. In addition, cylinder 82 may be replaced with one or more prongs attached to or manufactured integral to forward housing portion 15a, so each prong has a portion extending parallel to outer surface 23 in spaced relation (clearance area A), with similar means for carrying locking pins 90, as discussed supra.

Figure 11:
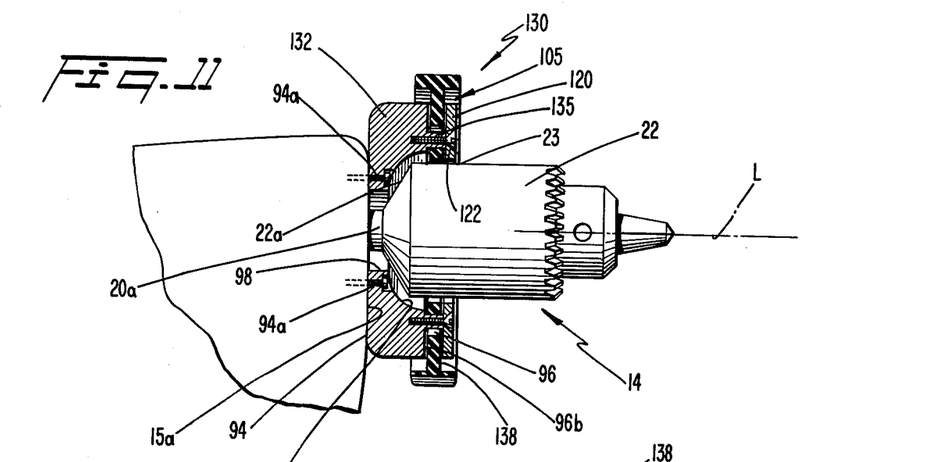
FIG. 11 is an enlarged, sectional view, taken along the line 11—11 of FIG. 12, and shows another embodiment of the present invention.
Figures 12, 12A, 13:
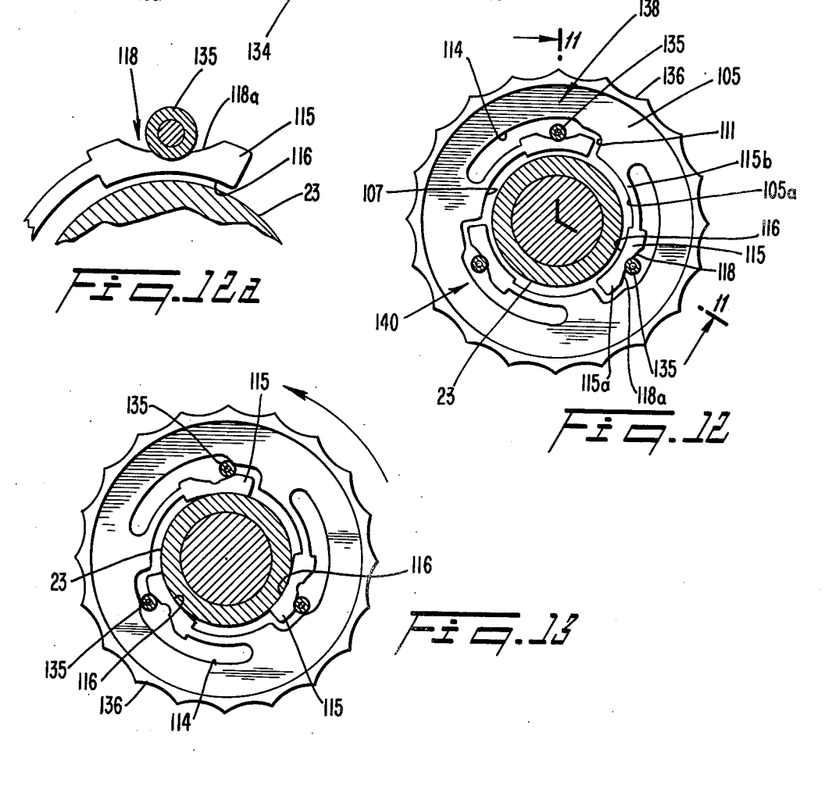
FIG. 12 is an enlarged front plan view of the embodiment shown in FIG. 11, wherein there is illustrated three equispaced integral brake arms in abutment with cam pins positioned within a cammed surface of the brake arm.
FIG. 12a is an enlarged, detailed view of a brake arm shown in FIG. 12.
FIG. 13 is a view similar to FIG. 12 showing the brake arms in frictional engagement with the locking drum when rotated and urged downwardly by the cam pins.

Reference is now made to FIGS. 11–13 of the drawing wherein there is illustrated an additional embodiment of a keyless chuck device 130 in accordance with the invention. The chuck device includes a solid cylindrical portion 132 with an annular attachment surface 94 facing housing portion 15a and a forward mounting surface 96 facing chuck portion 14. Central opening 98 in cylindrical portion 132 receives exposed drive shaft portion 20a when the cylindrical portion is fixedly attached to forward housing portion 15a via attachment surface 94 with mounting screws 94a, enabling chuck portion 14 and drive shaft 20 to rotate continuously during rotary tool 10 operation. Cylindrical portion 132 has an axial thickness so mounting surface 96 extends beyond rear portion 22a of locking drum 22, for reasons described infra. Central circular portion 134 of mounting surface 96 adjacent central opening 98 is shaped to clear the contour of rear portion 22a of locking drum 22 to avoid contact with the locking drum and chuck portion 14. Central portion 134 defines a peripherally located annular mounting surface 96b extending transversely relative to outer locking drum surface 23.

Three cam pins 135 spaced 120 degrees from each other relative to the longitudinal axis of chuck 14 project outwardly from annular mounting surface 96*b* so the axis of each is parallel to the axis L of chuck 14. Thin cylindrical disc portion 105 carried by cam pins 135 includes circumferential knurled or scalloped (or other gripping design) outer edge 136 and a circular inner surface 107 between which is a solid body portion 138 concentric with the axis of chuck 14; portion 138 includes a central, circular opening 105*a* concentric with and having a diameter slightly greater than the outer diameter of locking drum 22. Three elongated, circumferential extending resilient brake arms 115 integral with portion 138 extend tangentially along a portion of outer surface 23. To form brake arms 115, slots 140 are machined or stamped in solid body portion 138 to include a short radially extending inlet slot portion 111 intersecting inner surface 107. From slot portion 111, each of slots 140 curves approximately 90° into circumferential elongated arcuate slot portion 114 having an angular extent of approximately 90°. Each of brake arms 115 thus includes free end 115*a* supported at root 115*b* where the brake arm integrally joins solid body portion 138 and slot 114 terminates. Each of brake arms 115 includes an arcuate, circumferentially extending elongated frictional gripping surface 116 facing outer surface 23, and an acruate and/or tapered extending cam surface 118 which forms a slotted wall portion of elongated slot 114. Surface 116 is a true radius curve corresponding to the curvature of outer surface 23, as best shown in FIG. 12*a*. As shown in FIG. 12, cylindrical disc portion 105 is carried by cam pins 135 each of which is located at corresponding locations of slot portions 114 in abutment with cam surface 118. Cam surface 118 has a concave and/or tapered shape in the direction facing slot portion 114, so cam pin 135 rests on the bottom curved portion of the cam surface in closest proximity to outer surface 23 and retains disc 105 in centered position about locking drum 22 when not in use via resilient brake arms 115.

Ring shaped cover 120 is secured to cam pin ends 122 by screws or the like to cover and protect brake arms 115 and retain disc 105 in position about drum 22. With this design, brake arms are radially displaced by applying hand torque to outer edge 136 of disc portion 105 to rotate the disc relative to cylindrical portion 132, causing portions 118*a* of cam surfaces 118 to press against fixed cam pins 135, urging frictional gripping surface 116 into frictional engagement with outer surface 23 (FIG. 13). When motor 13 is actuated brake arms 115 are wedged into further frictional contact with outer surface 23 to lock up locking drum 22 to open and close chuck jaws 25. Outer edge 136 of disc 105 is knurled, scalloped, or treated to provide a better gripping surface for rotating the cylindrical disc portion relative to cylindrical portion 132. Brake arms 115 are disengaged from locking drum 22 by rotating the disc 105 in the opposite direction, returning cam pins 135 to the bottom portion of cam surface 118. It is to be understood that cam surface 118 must be properly shaped to enable inwardly directed gripping surface 116 to travel radially inward into frictional engagement with outer locking drum surface 23. In addition, any suitable number of equispaced brake arms 115 may be formed in disc portion 105. Also, cylindrical portion 132 can be manufactured integral to housing portion 15.

In a different embodiment (not shown), brake arms 115 can be replaced with symmetrical resilient attachment members extending between cammed slotted portions similar to slots 114. Such design eliminates slots 111 by requiring opposite ends of the attachment member to be integral to body portion 138.

While there have been described and illustrated several specific embodiments of the invention, it will be clear that variations in the details of the embodiments specifically illustrated and described may be made without departing from the true spirit and scope of the invention as defined in the appended claims. For example, the structure can be integral or separate from the chuck and/or drill, and/or tool or machine housing. In addition, the foregoing embodiments are preferred for use with rotary tools having reversible characteristics.

I claim:

1. In combination, a reversible power tool, said power tool including a rotary drive shaft and a chuck, the chuck including a locking drum and jaws for holding implements in place, the jaws being drivingly coupled to the shaft and coupled to the locking drum so the locking drum can be turned in first and second directions relative to the jaws to cause the jaws to open and close to enable insertion and removal of implements in the jaws, a structure for enabling the chuck to be opened and closed so that implements can be secured to and removed from the chuck by manually holding the chuck without using a key, the power tool including a housing having a wall through which the drive shaft extends, a motor for driving the drive shaft being located in the housing, the structure comprising an anchor sleeve having an inner diameter, a multiplicity of hand gripping projections fixedly mounted on the sleeve so that they are circumferentially spaced from each other about the periphery of the sleeve and extend radially away from the sleeve for enabling safe and comfortable hand gripping thereof to hold the drum in place relative to the housing when the jaws are driven by the shaft so that the jaws open and close when the shaft is respectively driven in first and second opposite directions while sufficient compressional force is applied by a hand of an operator through the projections and sleeve to the drum, the projections being made of an elastomeric material, the sleeve having an inner diameter dimensioned such that the sleeve fits over the locking drum and is elastically expanded over and frictionally urged against an exterior surface of the drum.

2. A structure for enabling a chuck of a reversible power tool driven by a rotary drive shaft to be opened and closed so that implements adapted to be held by the chuck can be secured to and removed from the chuck by manually holding the chuck without using a key, the drive shaft extending through a wall of a housing of the power tool, the housing including a motor for the drive shaft, the chuck including a locking drum and jaws for holding the implement in place, the jaws being drivingly coupled to the shaft and coupled to the locking drum so the locking drum can be turned in first and second directions relative to the jaws to cause the jaws to open and close to enable insertion and removal of implements in the jaws, the structure comprising an anchor sleeve having an inner diameter, hand gripping projection means fixedly mounted on and about the periphery of he sleeve and extend radially away from the sleeve for enabling safe and comfortable hand gripping thereof to hold the drum in place relative to the housing when the jaws are driven by the shaft so that the jaws open and close when the shaft is respectively driven in first and second opposite directions while sufficient compressional force is applied by a hand of an operator through the projection means and sleeve to the drum, the projection means being made of an elastomeric material, the sleeve having an inner diameter dimensioned such that the sleeve fits over the locking drum and is elastically expanded over and frictionally urged against an exterior surface of the drum, the sleeve include a radially extending flange fixedly mounted on and about the periphery of the sleeve so that it is axially displaced from the projection means, the flange having a surface adapted to be pushed by the hand so the surface frictionally bears against the housing wall to assist the structure in resisting rotation of the drum when the shaft turns the jaws.

3. A structure for enabling a chuck of a reversible power tool driven by a rotary drive shaft to be opened and closed so that implements adapted to be held by the chuck can be secured to and removed from the chuck by manually holding the chuck without using a key, the drive shaft extending through a wall of a housing of the power tool, the housing including a motor for the drive shaft, the chuck including a locking drum and jaws for holding the implement in place, the jaws being drivingly coupled to the shaft and coupled to the locking drum so the locking drum can be turned in first and second directions relative to the jaws to cause the jaws to open and close to enable insertion and removal of implements in the jaws, the structure comprising an anchor sleeve having an inner diameter, a multiplicity of hand gripping projections fixedly mounted on the sleeve so that they are circumferentially spaced from each other about the periphery of the sleeve and extend radially away from the sleeve for enabling safe and comfortable hand gripping thereof to hold the drum in place relative to the housing when the jaws are driven by the shaft so that the jaws open and close when the shaft is respectively driven in first and second opposite directions while sufficient compressional force is applied by a hand of an operator through the projections and sleeve to the drum, the projections being made of an elastomeric material, the sleeve having an inner diameter dimensioned such that the sleeve fits over the locking drum and is elastically expanded over and frictionally urged against an exterior surface of the drum.

4. The structure of claim 3 wherein the projections extend axially of the drum.

5. The structure of claim 4 wherein a peripheral contour of the projections tapers inwardly toward the sleeve and the jaws from a region closer to the housing than to the jaws to provide a contour and sufficient surface area for safe hand engagement of the projections to maintain adequate torque to maintain the drum stationary relative to the hand and housing and to enable the drum to rotate relative to the jaws and shaft.

6. The structure of claim 5 wherein the shaft extends through the housing wall and the sleeve includes a radially extending flange, the flange having a surface adapted to be pushed by the hand so the surface frictionally bears against the housing wall to assist the structure in resisting rotation of the drum when the shaft turns the jaws, the flange being axially displaced from the projections.

7. The structure of claim 6 wherein the surface of the flange has a concave shape to approximate the contour of at least a portion of the wall against which the surface bears.

8. The structure of claim 7 wherein the surface of the flange has a radius substantially greater than the radius of the projections.

9. The structure of any one of claims 3, 4, 5, 6, 7 or 8 wherein the projections are axially parallel fins.

10. The structure of claim 3 wherein the sleeve includes a radially extending flange, the flange having a surface adapted to be pushed by the hand so the surface frictionally bears against the housing wall to assist the structure in resisting rotation of the drum when the shaft turns the jaws, the flange being axially displaced from the projections.

11. The structure of claim 10 wherein the surface of the flange has a concave shape to approximate the contour of at least a portion of the wall against which the surface bears.

12. The structure of claim 11 wherein the surface of the flange has a radius substantially greater than the radius of the projections.

13. The structure of any one of claims 3, 4, 5, 6, 7, 8, 10, 11 or 12 wherein the sleeve and projections are integral with each other and are made of the same material.

* * * * *